(12) United States Patent
Lin et al.

(10) Patent No.: US 6,380,695 B1
(45) Date of Patent: Apr. 30, 2002

(54) DRIVING DEVICE FOR FLUORESCENT TUBE

(75) Inventors: Chih-Hung Lin; Jung Chan Hsieh, both of Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 09/729,268

(22) Filed: Dec. 5, 2000

(51) Int. Cl.$^7$ .................................................. G05F 1/00
(52) U.S. Cl. ............................ 315/291; 315/55; 315/70; 315/209 R
(58) Field of Search ............................ 315/291, 55, 70, 315/209 R, 307, 313

(56) References Cited

U.S. PATENT DOCUMENTS 5,371,439 A * 12/1994 Griffin ......................... 315/291
5,886,477 A * 3/1999 Honbo et al. ........... 315/209 PZ
6,153,962 A * 11/2000 Noma et al. ........... 315/209 PZ

* cited by examiner

*Primary Examiner*—Don Wong
*Assistant Examiner*—Jimmy T. Vu
(74) *Attorney, Agent, or Firm*—Bacon & Thomas, PLLC

(57) ABSTRACT

A driving device for a fluorescent tube has a high frequency oscillator which outputs a high frequency AC signal. A pulse width modulator is connected to the high frequency oscillator for outputting a PWM harmonic frequency signal. A first power switch is connected to the pulse width modulator for being turned off during a positive half-cycle of the PWM harmonic frequency signal and being turned on during a negative half-cycle of the PWM harmonic frequency signal. A second power switch is connected to the pulse width modulator for being turned on during the positive half-cycle of the PWM harmonic frequency signal and being turned off during the negative half-cycle of the PWM harmonic frequency signal. A piezoelectric transformer includes a primary winding having two input terminals connected to the first power switch and the second power switch, respectively, and a center terminal connected to the output terminal of the pulse width modulator.

8 Claims, 2 Drawing Sheets

DRIVING DEVICE FOR FLUORESCENT TUBE

BACKGROUND OF THE INVENTION

1. Field of the Invention

The present invention relates to a driving device for fluorescent tube and, more particularly, to a fluorescent tube driving device capable of driving a fluorescent tube to emit light with high brightness.

2. Description of Related Art

Conventionally, a driving device is required for starting and driving a fluorescent tube to emit light. Typically, the starting voltage of fluorescent tube is about several hundred volts, and thus the driving device must provide such a high voltage output. As such, the quality of the output voltage provided by the driving device determines the brightness of light emitted from the fluorescent tube and the stability of fluorescent light. A conventional driving device for fluorescent tube is implemented by a winding-based electronic oscillation circuit for providing the high voltage output. However, such a winding-based electronic oscillation circuit is not able to provide a high step-up voltage for output with high conversion efficiency due to the limitation of the oscillation frequency. Furthermore, the starting time is more than 0.5 to 0.8 second, which is deemed to be relatively long. Recently, the liquid crystal display has become more and more popular. The liquid crystal display generally requires a back light module using a cold cathode fluorescent lamp (CCFL) as the light source. Such a back light module is required to have a high energy conversion efficiency. As such, it becomes an important issue to have a driving device for driving the fluorescent tube to steadily emit fluorescent light with high brightness.

SUMMARY OF THE INVENTION

The object of the present invention is to provide a driving device for fluorescent tube capable of providing a high conversion efficiency and high step-up voltage ratio to emit light with high brightness, and providing a short starting time to protect the fluorescent tube.

To achieve the object, there is provided with a driving device for a fluorescent tube, which comprises: a high frequency oscillator having an input terminal connected to a power source, and an output terminal for outputting a high frequency AC signal; a pulse width modulator (PWM) having an input terminal connected to the output terminal of the high frequency oscillator, and an output terminal for outputting a PWM harmonic frequency signal; a first power switch connected to the output terminal of the pulse width modulator for being turned off during a positive half-cycle of the PWM harmonic frequency signal and being turned on during a negative half-cycle of the PWM harmonic frequency signal; a second power switch connected to the output terminal of the pulse width modulator for being turned on during the positive half-cycle of the PWM harmonic frequency signal and being turned off during the negative half-cycle of the PWM harmonic frequency signal; and a piezoelectric transformer having a primary winding and a secondary winding, the primary winding having two input terminals connected to the first power switch and the second power switch, respectively, and a center terminal connected to the output terminal of the pulse width modulator.

Other objects, advantages, and novel features of the invention will become more apparent from the detailed description when taken in conjunction with the accompanying drawings.

DETAILED DESCRIPTION OF THE PREFERRED EMBODIMENT

Figure 1:
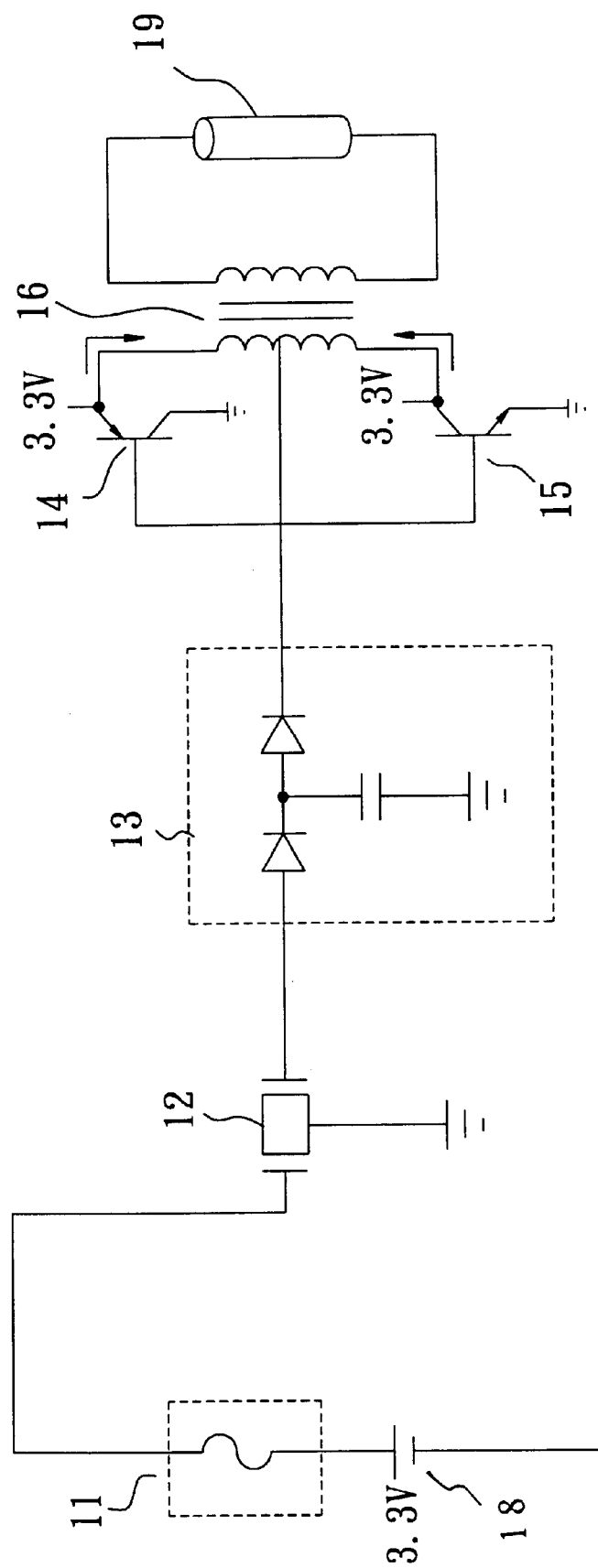
FIG. 1 is a circuit diagram of the driving device for fluorescent tube in accordance with the present invention.

With reference to FIG. 1, there is shown a driving device for fluorescent tube in accordance with a preferred embodiment of the present invention, which includes a current limiter 11, a high frequency oscillator 12, a pulse width modulator 13, a first power switch 14, a second power switch 15, and a piezoelectric transformer 16, so as to convert the power of a battery 18 into a high voltage power for starting and driving a fluorescent tube 19. In this preferred embodiment, the fluorescent tube 19 is a CCFL tube, and the battery 18 provides a 3.3V DC power.

Figure 2:
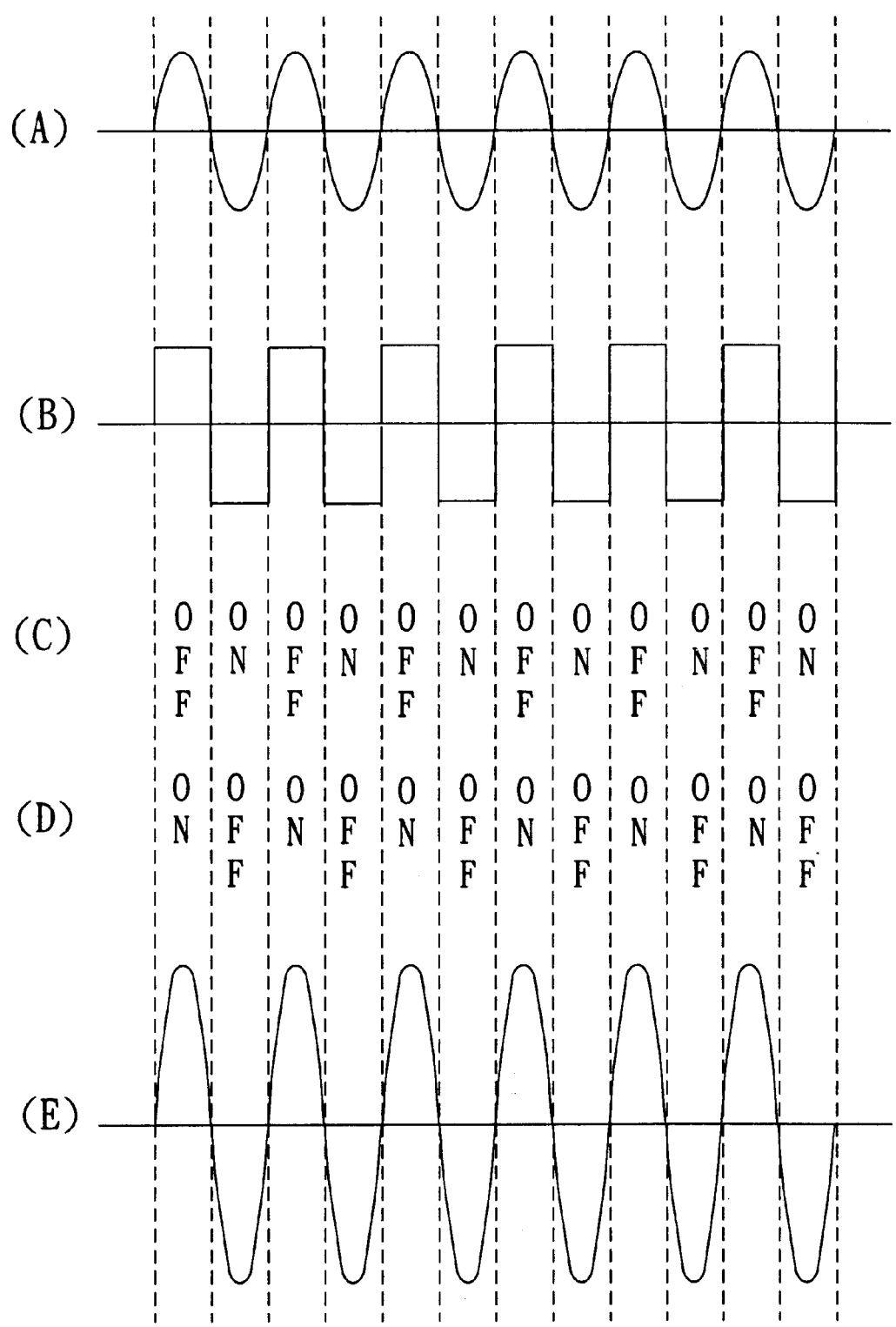
FIG. 2 shows the operating waveforms of the driving device for fluorescent tube in accordance with the present invention.

The current limiter 11 is implemented as a fuse. One end of the current limiter 11 is connected to the battery 18 for protecting the driving device from being damaged by an over-current. The other end of the current limiter 11 is connected to the input terminal of the high frequency oscillator 12. As such, the 3.3V DC power from battery 18 is converted into a high frequency alternating current (AC) signal. In this preferred embodiment, the high frequency oscillator 12 is implemented as a crystal oscillator. Alternatively, the high frequency oscillator 12 can be implemented as a Kapler oscillation circuit, a RC phase-shift oscillation circuit, or the like. The waveforms of the high frequency AC signal at the output terminal of the high frequency oscillator 12 is shown in FIG. 2(A).

The output terminal of high frequency oscillator 12 is connected to the input terminal of the pulse width modulator 13, so as to apply a pulse width modulation (PWM) process to the high frequency AC signal and thus generate a PWM harmonic frequency signal at the output terminal of the pulse width modulator 13. The waveforms of the PWM harmonic frequency signal is shown in FIG. 2(B). In this preferred embodiment, the pulse width modulator 13 is implemented by two diodes connected in series and a capacitor connected between the connection point of the two diodes and the ground.

The output terminal of the pulse width modulator 13 is connected to a center terminal of the primary winding of the piezoelectric transformer 16 and the first and second power switches 14 and 15. In this preferred embodiment, the first power switch 14 is a PNP power transistor, and the second power switch 15 is a NPN power transistor. The bases of the two power transistors are connected to the output terminal of the pulse width modulator 13. The emitter of the PNP power transistor is connected to the power source (e.g., 3.3V battery) and an input terminal of the primary winding of the piezoelectric transformer 16, while the collector thereof is grounded. Furthermore, the emitter of the NPN power transistor is connected to the power source and the other input terminal of the primary winding of the piezoelectric transformer 16 respectively, while the collector thereof is grounded. Consequently, with reference to FIGS. 2(B), (C) and (D), the first power switch 14 is off and second power switch 15 is on during the positive half-cycle of the PWM harmonic frequency signal at the output terminal of pulse width modulator 13. Hence, current of the battery flows from the emitter of the first power switch 14 to the primary winding of piezoelectric transformer 16 for being converted by the piezoelectric transformer 16 into a high voltage of positive half-cycle at the secondary winding. The waveform can be referenced to FIG. 2(E). On the contrary, the first power switch 14 is on and second power switch 15 is off during the negative half-cycle of the PWM harmonic frequency signal at the output terminal of pulse width modulator 13. Hence, current of the battery flows from the collector of the second power switch 15 to the primary winding of the piezoelectric transformer 16 for being converted by the piezoelectric transformer 16 into a high voltage of negative half-cycle at the secondary winding. The waveform can be referenced to FIG. 2(E). In such a manner, the first power switch 14 and second power switch 15 are alternately turned on and off by the PWM harmonic frequency signal generated at the output terminal of pulse width modulator 13, so as to alternately apply current to the piezoelectric transformer 16, thereby producing a desired AC high voltage output at secondary winding of the piezoelectric transformer 16 for starting and driving the CCFL fluorescent tube 19 connected to the piezoelectric transformer 16.

In view of the foregoing, it is appreciated that the present invention utilizes pulse width modulation technique to provide a constant high frequency signal to drive the piezoelectric transformer and control the power switches to be alternately turned on and off, so that the conversion efficiency at the power side can be relatively close to 1 (about 0.85~0.95), and the voltage step-up ratio can be as high as 300, thereby providing a high brightness output. Furthermore, due to the high frequency feature of the PWM harmonic frequency signal, a short starting time of about 0.1~0.3 second can be obtained, so as to better protect the fluorescent tube. In addition, there is no integrated circuit chip incorporated in the driving device, and the 3.3V low starting voltage can be employed without using any additional voltage stability chip.

Although the present invention has been explained in relation to its preferred embodiment, it is to be understood that many other possible modifications and variations can be made without departing from the spirit and scope of the invention as hereinafter claimed.

What is claimed is:

1. A driving device for a fluorescent tube, comprising:
    a high frequency oscillator having an input terminal connected to a power source, and an output terminal for outputting a high frequency AC signal;
    a pulse width modulator (PWM) having an input terminal connected to the output terminal of the high frequency oscillator, and an output terminal for outputting a PWM harmonic frequency signal;
    a first power switch connected to the output terminal of the pulse width modulator for being turned off during a positive half-cycle of the PWM harmonic frequency signal and being turned on during a negative half-cycle of the PWM harmonic frequency signal;
    a second power switch connected to the output terminal of the pulse width modulator for being turned on during the positive half-cycle of the PWM harmonic frequency signal and being turned off during the negative half-cycle of the PWM harmonic frequency signal; and
    a piezoelectric transformer having a primary winding and a secondary winding, the primary winding having two input terminals connected to the first power switch and the second power switch, respectively, and a center terminal connected to the output terminal of the pulse width modulator.

2. The driving device as claimed in claim 1, further comprising a current limiter connected between the power source and the high frequency oscillator.

3. The driving device as claimed in claim 2, wherein the current limiter is a fuse.

4. The driving device as claimed in claim 1, wherein the high frequency oscillator is a crystal oscillator.

5. The driving device as claimed in claim 1, wherein the high frequency oscillator is a Kapler oscillation circuit.

6. The driving device as claimed in claim 1, wherein the pulse width modulator has two diodes connected in series and a capacitor connected between the connection point of the two diodes and the ground.

7. The driving device as claimed in claim 1, wherein the first power switch is a PNP power transistor and the second power switch is a NPN power transistor, the bases of the two transistors being connected to the output terminal of the pulse width modulator, the emitter of the PNP power transistor being connected to the power source and an input terminal of the primary winding of the piezoelectric transformer, and the collector thereof being grounded, the emitter of the NPN power transistor being connected to the power source and the other input terminal of the primary winding of the piezoelectric transformer, and the emitter thereof being grounded.

8. The driving device as claimed in claim 1, wherein the fluorescent lamp is a cold cathode fluorescent lamp (CCFL) tube.

* * * * *